United States Patent
Suzuki et al.

(10) Patent No.: US 11,984,726 B2
(45) Date of Patent: May 14, 2024

(54) CHARGE/DISCHARGE CONTROL METHOD FOR CHARGE/DISCHARGE ELEMENT AND CHARGE/DISCHARGE CONTROL DEVICE FOR CHARGE/DISCHARGE ELEMENT

(71) Applicants: NISSAN MOTOR CO., LTD., Yokohama (JP); RENAULT s.a.s., Boulogne-Billancourt (FR)

(72) Inventors: Kenta Suzuki, Kanagawa (JP); Keigo Ikezoe, Kanagawa (JP); Kensuke Murai, Kanagawa (JP)

(73) Assignees: NISSAN MOTOR CO., LTD., Yokohama (JP); RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 18/276,602

(22) PCT Filed: Feb. 10, 2021

(86) PCT No.: PCT/IB2021/000083
§ 371 (c)(1),
(2) Date: Aug. 9, 2023

(87) PCT Pub. No.: WO2022/172045
PCT Pub. Date: Aug. 18, 2022

(65) Prior Publication Data
US 2024/0120742 A1    Apr. 11, 2024

(51) Int. Cl.
*H02J 3/32* (2006.01)
*H02J 3/02* (2006.01)
(Continued)

(52) U.S. Cl.
CPC ............ *H02J 3/322* (2020.01); *H02J 3/02* (2013.01); *H02J 7/0047* (2013.01); *H02J 7/00712* (2020.01); *H02J 13/00022* (2020.01)

(58) Field of Classification Search
CPC .... H02J 3/322; H02J 3/00022; H02J 7/00712; H02J 3/02; H02J 7/0047
(Continued)

(56) References Cited

U.S. PATENT DOCUMENTS 11,069,927 B2 * 7/2021 Yokoyama ............ H02J 7/0048
2011/0241647 A1   10/2011 Hershey et al.
(Continued)

FOREIGN PATENT DOCUMENTS

JP    2009-112148 A    5/2009
JP    2011-217600 A    10/2011
(Continued)

OTHER PUBLICATIONS

U.S. Appl. No. 18/276,560, filed Aug. 9, 2023, Nissan Motor Co., Ltd.; Renault S.A.S.
(Continued)

*Primary Examiner* — Daniel Cavallari
*Assistant Examiner* — Dru M Parries
(74) *Attorney, Agent, or Firm* — Foley & Lardner LLP

(57) ABSTRACT

A charge/discharge control method for a charge/discharge element includes receiving a request value (Pfr) of a frequency adjustment capacity according to a system frequency (f) of an electric power system (10) based on a priority degree (β) and the request value (Pfr) being received, the priority degree indicating a degree at which charging or discharging of an own element (EV1) is prioritized over charging or discharging of another charge/discharge element (EV2, EV3, . . . ), correcting the output property to increase an upper limit value or a lower limit value of an output range as the priority degree (β) is higher, and performing charging or discharging with an output determined based on a deviation (Δf) between the system frequency (f) measured at a connection end to the electric power system (10) and a
(Continued)

reference frequency (fref) of the electric power system (10) and the output property after the correction.

7 Claims, 8 Drawing Sheets

(51) Int. Cl.
*H02J 7/00* (2006.01)
*H02J 13/00* (2006.01)

(58) Field of Classification Search
USPC .......................................................... 307/32
See application file for complete search history.

(56) References Cited

U.S. PATENT DOCUMENTS

| | | |
|---|---|---|
| 2013/0119947 A1 | 5/2013 | Ishida et al. |
| 2015/0357854 A1 | 12/2015 | Watanabe |
| 2016/0274607 A1 | 9/2016 | Kudo et al. |
| 2017/0010595 A1 | 1/2017 | Kawaguchi |
| 2017/0018923 A1 | 1/2017 | Rombouts |

FOREIGN PATENT DOCUMENTS

| | | |
|---|---|---|
| JP | 2012-039685 A | 2/2012 |
| JP | 2012-257436 A | 12/2012 |
| JP | 2013-172537 A | 9/2013 |
| JP | 2014-090586 A | 5/2014 |
| JP | 5598896 B2 | 10/2014 |
| JP | 2015-057936 A | 3/2015 |
| JP | 2016-015875 A | 1/2016 |
| JP | 6168528 B2 | 7/2017 |
| JP | 2017-158363 A | 9/2017 |
| JP | 2018-064458 A | 4/2018 |
| JP | 2018-160821 A | 10/2018 |
| WO | WO-2020/194010 A1 | 10/2020 |

OTHER PUBLICATIONS

U.S. Appl. No. 18/276,577, filed Aug. 9, 2023, Nissan Motor Co., Ltd.; Renault S.A.S.

U.S. Appl. No. 18/276,614, filed Aug. 9, 2023, Nissan Motor Co., Ltd.; Renault S.A.S.

* cited by examiner

CHARGE/DISCHARGE CONTROL METHOD FOR CHARGE/DISCHARGE ELEMENT AND CHARGE/DISCHARGE CONTROL DEVICE FOR CHARGE/DISCHARGE ELEMENT

TECHNICAL FIELD

The present invention relates to a charge/discharge control method for a charge/discharge element and a charge/discharge control device for a charge/discharge element.

BACKGROUND ART

PTL 1 describes a technique relating to frequency stabilization of an electric power system. In this technique, a system frequency is measured on the electric power system side, and a frequency adjustment capacity of the electric power system is calculated based on a deviation between the measured system frequency and a reference frequency. Moreover, information according to the calculated frequency adjustment capacity is transmitted simultaneously from the electric power system side to a plurality of power reception amount control loads connected to the electric power system. Each of the power reception amount control loads measures a system frequency by its self, and a power reception amount of each of the power reception amount control loads is controlled based on the measured system frequency, the information received from the electric power system side, and the reference frequency.

CITATION LIST

Patent Literature

Patent Literature 1: Japanese Patent No. 5598896

SUMMARY OF INVENTION

In PTL 1, an electric car is described as a suitable example of a power reception amount control load. In the electric car, a charge/discharge output property of a battery is set according to an own priority degree in some cases. The own priority degree indicates a degree at which charging or discharging of an own battery is prioritized over charging/discharging of a battery of another electric car connected to the same electric power system.

When electric cars set charge/discharge output properties of their batteries according to their own priority degrees, an electric car having a low priority degree sets a charge/discharge output property within an output range narrower than that of an electric car having a high priority degree. The electric car with the narrow output range of the charge/discharge output property has a smaller frequency adjustment capacity acquired by power reception amount control, as compared to the electric car with the wide output range of the charge/discharge output property. Thus, in the technique of PTL 1, for example, when power reception amount control is performed while regarding a battery of an electric car as a power reception amount control load, the frequency adjustment capacity calculated on the system side cannot sufficiently be secured due to a priority degree set in the electric car in some cases.

The present invention has been made in view of the above-mentioned circumstance, and an object of the present invention is to enable a frequency adjustment capacity calculated on an electric power system side to be secured sufficiently on a charge/discharge element side.

Solution to Problem

In order to solve the above-mentioned problem, in a charge/discharge control method for a charge/discharge element according to one aspect of the present invention, a plurality of charge/discharge elements connected to an electric wire of an electric power system receive a request value of a frequency adjustment capacity according to a system frequency of the electric power system, the request value being broadcast-transmitted to all the charge/discharge elements. An output property of charging/discharging with respect to the system frequency, which is determined based on the request value and a priority degree indicating a degree at which charging or discharging of an own element is prioritized over another charge/discharge element, is corrected to increase an upper limit value or a lower limit value of an output range as the priority degree is higher. Charging or discharging is performed with an output determined based on a deviation between the system frequency measured at a connection end to the electric power system and a reference frequency of the electric power system and the output property after the correction.

Advantageous Effects

According to the present invention, the frequency adjustment capacity calculated on the electric power system side can be secured sufficiently on the charge/discharge element side.

DESCRIPTION OF EMBODIMENTS

Figure 1:
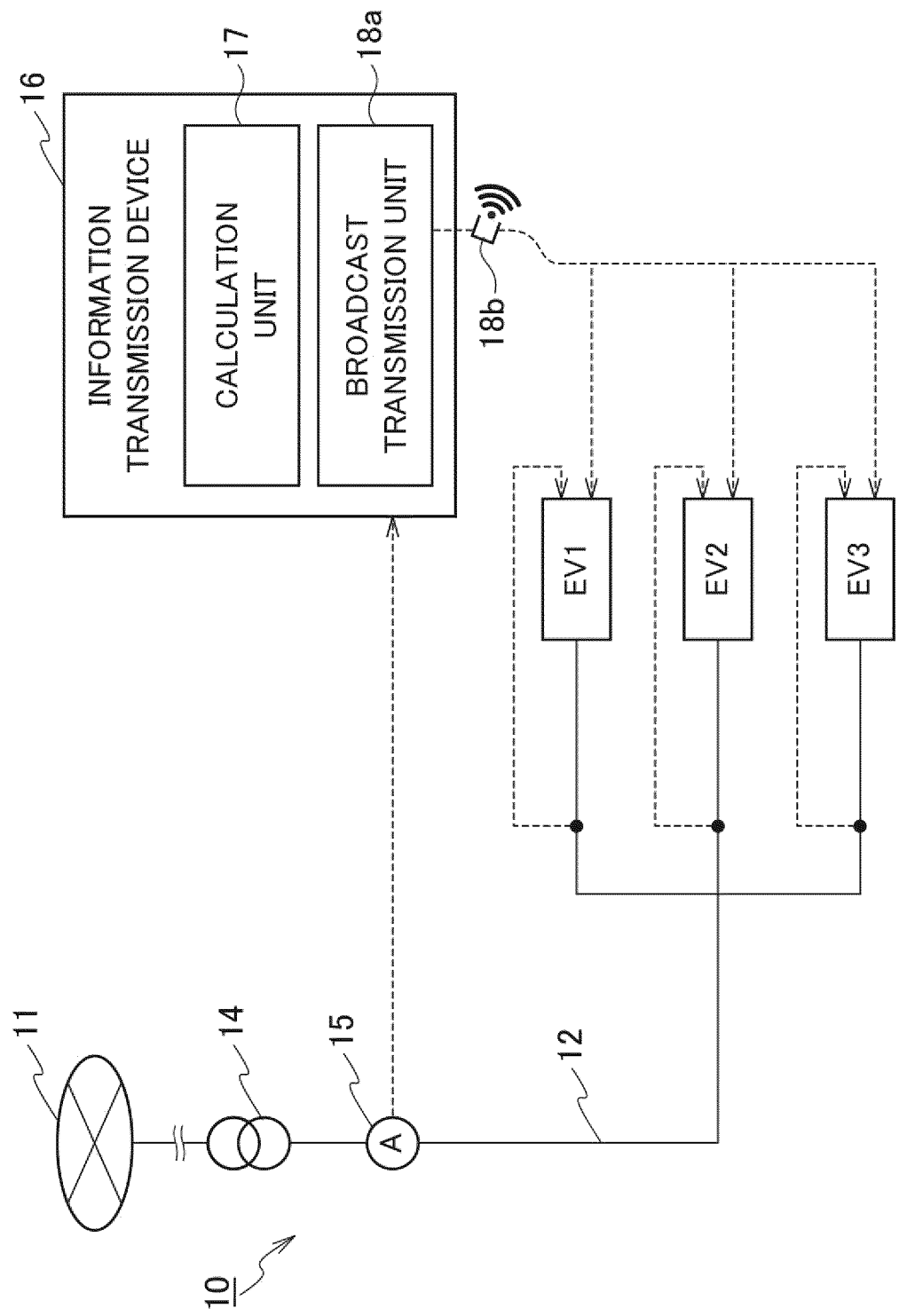
FIG. 1 is a diagram illustrating a configuration of an electric power system including charge/discharge elements to which a charge/discharge control method according to an embodiment of the present invention is applied.

With reference to the drawings, an embodiment, modification examples thereof, and specific examples to which the embodiment or the modification examples are applied are described. In the illustrations of the drawings, the same parts are denoted by the same reference numerals, and the descriptions therefor are omitted.

(Electric Power System)

With reference to FIG. 1, description is made on configurations of electric cars each of which includes a charge/discharge control device according to an embodiment mounted thereon and an electric power system to which the electric cars are connected.

Electric cars EV1 to EV3 (examples of a charge/discharge element) each include each include the charge/discharge control device according to the embodiment, and are electrically connected to an electric power network 11 via an electric wire 12 that is commonly shared. Another power consuming element is also connected to the electric wire 12. The other power consuming element and the electric cars EV1 to EV3 are elements constituting a load group to which electric power is supplied from an electric power system 10.

Figure 3:
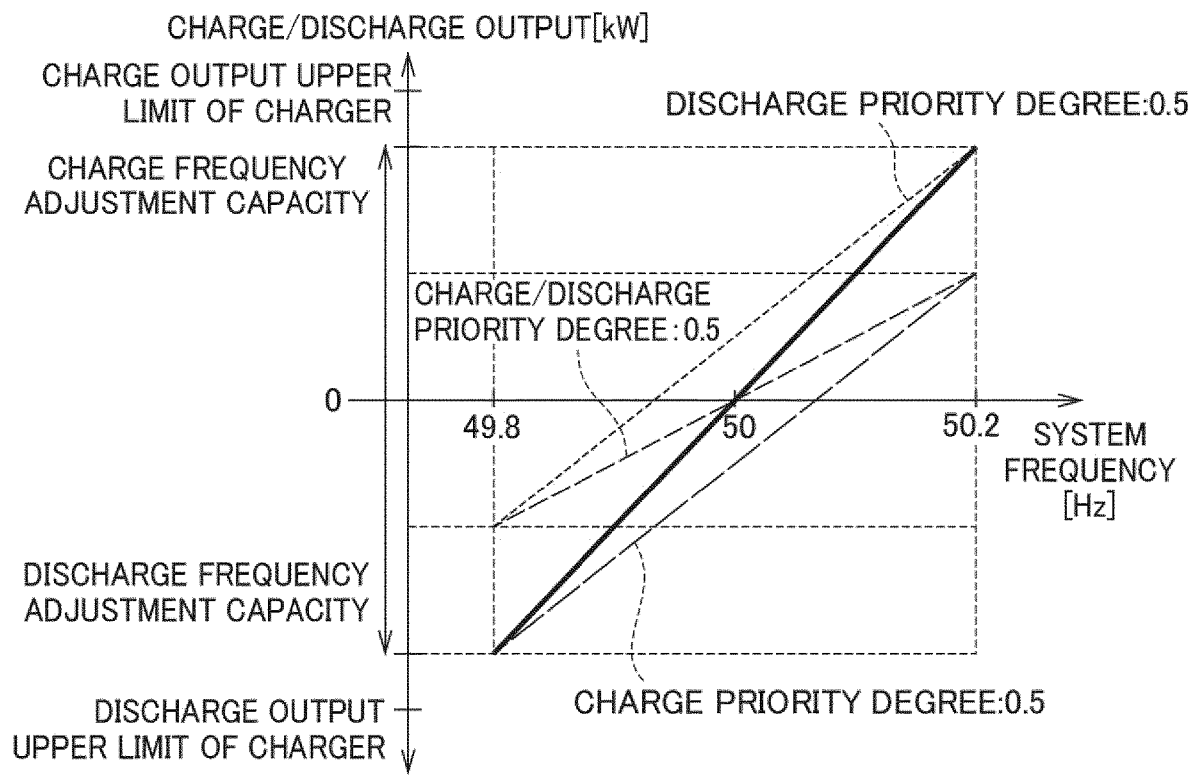
FIG. 3 is a graph showing a relationship between an output property of charging/discharging that is determined by a property determination unit in FIG. 2 according to a priority degree of the electric car and a reference property of charging/di s charging.

The electric cars EV1 to EV3 are capable of receiving the electric power from the electric power network 11 (charging) and transmitting the electric power to the electric power network 11 (discharging) via the electric wire 12. The charge/discharge control devices autonomously control the electric power charged/discharged by the electric cars EV1 to EV3 on which the own devices are respectively mounted (charged/discharged electric power). The number of electric cars (EV) that are connected to the electric wire 12 and autonomously control the charged/discharged electric power is not limited to three, which is shown in FIG. 3.

The electric wire 12 is connected to the electric power network 11 via an electric current measurement device 15 and a transformer 14. The electric cars EV1 to EV3 receive the electric power from the electric current measurement device 15 side, and transmit the electric power to the electric current measurement device 15 side. As an example of the transformer 14, there is exemplified a pole-mounted transformer (pole transformer) that transforms a voltage applied to a high-voltage distribution line into a voltage used at home or in an office.

The electric current measurement device 15 measures an electric current flowing through the electric wire 12, and calculates a current value (Pall-now) of the total charged/discharged electric power that is charged/discharged by the electric cars EV1 to EV3 as a whole via the electric wire 12, based on the measured electric current and the voltage of the electric wire 12. Further, the electric current measurement device 15 measures a system frequency (f) of the electric power system 10, based on the measured electric current.

The system frequency (f) is a frequency of the electric current flowing through the electric wire 12.

When the supply and demand of the electric power are well balanced in the electric power system 10, the system frequency (f) is a reference frequency (fref). When the balance between the supply and demand of the electric power is lost in the electric power system 10, the system frequency (f) is deviated from the reference frequency (fref). For example, when the demand for the electric power falls below the supply in the electric power system 10, the system frequency (f) is higher than the reference frequency (fref). When the demand for the electric power exceeds the supply in the electric power system 10, the system frequency (f) is lower than the reference frequency (fref).

The electric power system 10 is an electric power system capable of controlling and optimizing the flow of the electric power from both the supply side and the demand side. The electric power system 10 is a concept including a smart grid, a smart community, and a microgrid or Mansion Energy Management System (MEMS) that manage a range from an energy supply source to an end user within a limited area such as an office and a factory via a communication network. The electric power system 10 includes the electric power network 11, the electric wire 12, the transformer 14, and the electric current measurement device 15 that are illustrated in FIG. 1. The electric power network 11 includes various types of power plants such as a thermal power plant, a nuclear power plant, and a hydraulic power plant, and a transformer substation where the voltage is transformed from several hundred thousand volts to several thousand volts (V).

In the embodiment, the electric power system 10 further includes an information transmission device 16. The information transmission device 16 is a computer or a server that controls and optimizes the follow of the electric power from both the supply side and the demand side, and is connected to the electric current measurement device 15 via a computer network. Alternatively, the information transmission device 16 may acquire various types of electric power information from the electric current measurement device 15 via the electric power network 11.

The information transmission device 16 includes a calculation unit 17 that generates a signal of requesting the electric cars EV1 to EV3 as a whole to perform charging or discharging, based on various types of the electric power information supplied from the electric power system 10, and a broadcast transmission unit 18a and a broadcast transmission device 18b that broadcast-transmit the signal generated by the calculation unit 17 to the electric cars EV1 to EV3.

When the system frequency (f) that is input from the electric current measurement device 15 is deviated from the reference frequency (fref), the calculation unit 17 generates the signal of requesting the electric cars EV1 to EV3 as a whole to perform charging or discharging. With the generated signal, the electric cars EV1 to EV3 as a whole are requested to perform charging or discharging for restoring the system frequency (f) to the reference frequency (fref).

The signal generated by the calculation unit 17 includes a request for the electric cars EV1 to EV3 as a whole to perform charging or discharging, that is, a "system request". For example, the system request is an electric power difference (ΔP) obtained by subtracting the current value (Pall-now) of the total charged/discharged electric power from a maximum value (Pall_max) of the total charged/discharged electric power.

The maximum value (Pall_max) of the total charged/discharged electric power is a maximum value of an electric power amount by which the electric cars EV1 to EV3 as a whole can perform charging or discharging via the electric wire 12. The current value (Pall-now) of the total charged/discharged electric power is a current value of the electric power amount by which the electric cars EV1 to EV3 as a whole now perform charging or discharging via the electric wire 12. The electric power difference (ΔP) obtained by subtracting the current value (Pall-now) of the total charged/discharged electric power from the maximum value (Pall_max) of the total charged/discharged electric power is a request value (Pfr) of a frequency adjustment capacity for matching the system frequency (f) with the reference frequency (fref) and balancing the supply and demand of the electric power in the electric power system 10.

The information transmission device 16 receives the system frequency (f) of the electric power system 10 that is measured by the electric current measurement device 15, via the computer network or the electric power network 11. The information transmission device 16 includes a storage device that stores data indicating a basic output property of the total charged/discharged electric power (Pall) with respect to the system frequency (f) of the electric power system 10, and the calculation unit 17 calculates the maximum value (Pall_max) of the total charged/discharged electric power by using the system frequency (f) received from the electric current measurement device 15 and the data relating to the basic output property that is read from the storage device.

As shown in Expression (1), the calculation unit 17 calculates the electric power difference (ΔP) by subtracting the current value (Pall-now) of the total charged/discharged electric power from the maximum value (Pall_max) of the total charged/discharged electric power. In a situation in which the electric power system 10 requests the electric cars EV1 to EV3 to perform charging, the calculation unit 17 calculates an electric power difference for charging. The electric power difference for charging is calculated by subtracting the current value of the total charging electric power, which is now transmitted to the electric cars EV1 to EV3 as a whole via the electric wire 12, from the maximum value of the total charging electric power, which can be transmitted to the electric cars EV1 to EV3 as a whole via the electric wire 12.

Meanwhile, in a situation in which the electric power system 10 requests the electric cars EV1 to EV3 to perform discharging, the calculation unit 17 calculates an electric power difference (ΔP) for discharging. The electric power difference for discharging is calculated by subtracting the current value of the total discharging electric power, which is now received from the electric cars EV1 to EV3 as a whole via the electric wire 12, from the maximum value of the total discharging electric power, which can be received from the electric cars EV1 to EV3 as a whole via the electric wire 12. The electric power difference (ΔP) is a positive value equal to or greater than zero, and is a concept including the electric power difference for charging and the electric power difference for discharging.

Note that the situation in which the electric power system 10 requests the electric cars EV1 to EV3 to perform charging or discharging changes according to the balance between the supply and demand of the electric power in the electric power system 10. The information transmission device 16 includes a storage device that stores data indicating the maximum value (Pall_max) of the total charged/discharged electric power in advance, and the calculation unit 17 calculates the electric power difference (ΔP) by using the data indicating the maximum value (Pall_max) of the total charged/discharged electric power that is read from the storage device. A method disclosed in International Patent Publication No. WO 2020/194010 may be used as the calculation method for the electric power difference (ΔP).

[Expression 1]

$$\Delta P = P_{all\_max} - P_{all\_now} \quad (1)$$

The broadcast transmission unit 18a uses the broadcast transmission device 18b to broadcast-transmit (broadcast), to all the electric cars EV1 to EV3 . . . , an electric signal indicating the request value (Pfr) of the frequency adjustment capacity that is calculated by the calculation unit 17 as the electric power difference (ΔP). Further, after the request value (Pfr) is broadcast-transmitted, the broadcast transmission unit 18a uses the broadcast transmission device 18b to broadcast-transmit (broadcast), to all the electric cars EV1 to EV3 . . . , an electric signal indicating an excess/deficit capacity (ΔPfr) of the frequency adjustment capacity.

The excess/deficit capacity (ΔPfr) of the frequency adjustment capacity is a difference between a theoretical value and an actual value of a charge/discharge output by all the electric cars EV1 to EV3. The calculation unit 17 is capable of calculating the theoretical value of the charge/discharge output by all the electric cars EV1 to EV3 . . . , based on a deviation (Δf) of the system frequency (f) (actual measurement value) of the electric wire 12 connected to all the electric cars EV1 to EV3 . . . , which is measured by the electric current measurement device 15 after the request value (Pfr) is broadcast-transmitted, from the reference frequency (fref) and based on the data relating to the basic output property that is read from the storage device of the information transmission device 16. The actual value of the charge/discharge output by all the electric cars EV1 to EV3 can be regarded as the current value (Pall-now) of the total electric power that is charged/discharged by all the electric cars EV1 to EV3 . . . , which is calculated by the electric current measurement device 15 after the request value (Pfr) is broadcast-transmitted.

As the broadcast-transmission method, a wireless local area network (LAN) such as Wi-Fi (registered trademark) or Bluetooth (registered trademark) may be used.

In the embodiment, "the electric cars EV1 to EV3" are examples of "the charge/discharge element" that charges or discharges the electric power via the electric wire 12. The charge/discharge element stores the received electric power in a battery (including a secondary battery, a storage battery, and a rechargeable battery). "The charge/discharge element" includes various apparatuses and devices that include batteries, such as vehicles (including an electric car, a hybrid car, construction machinery, and agricultural machinery), railroad vehicles, playground equipment, tools, household appliances, and daily goods. In the embodiment, as an example of the charge/discharge element, there is exemplified an electric car (EV) that travels with electricity as an energy source and a motor as a driving source. However, it is not intended to limit the charge/discharge element of the present invention to the electric car (EV).

"The charge/discharge element" indicates a unit configuration for charge/discharge control performed by the charge/discharge control device according to the embodiment. Specifically, the charge/discharge control according to the embodiment is performed for the charge/discharge element as a unit. For example, each of the plurality of electric cars EV1 to EV3 can be subjected to the charge/discharge control independently and in parallel.

(Electric Car)

Figure 2:
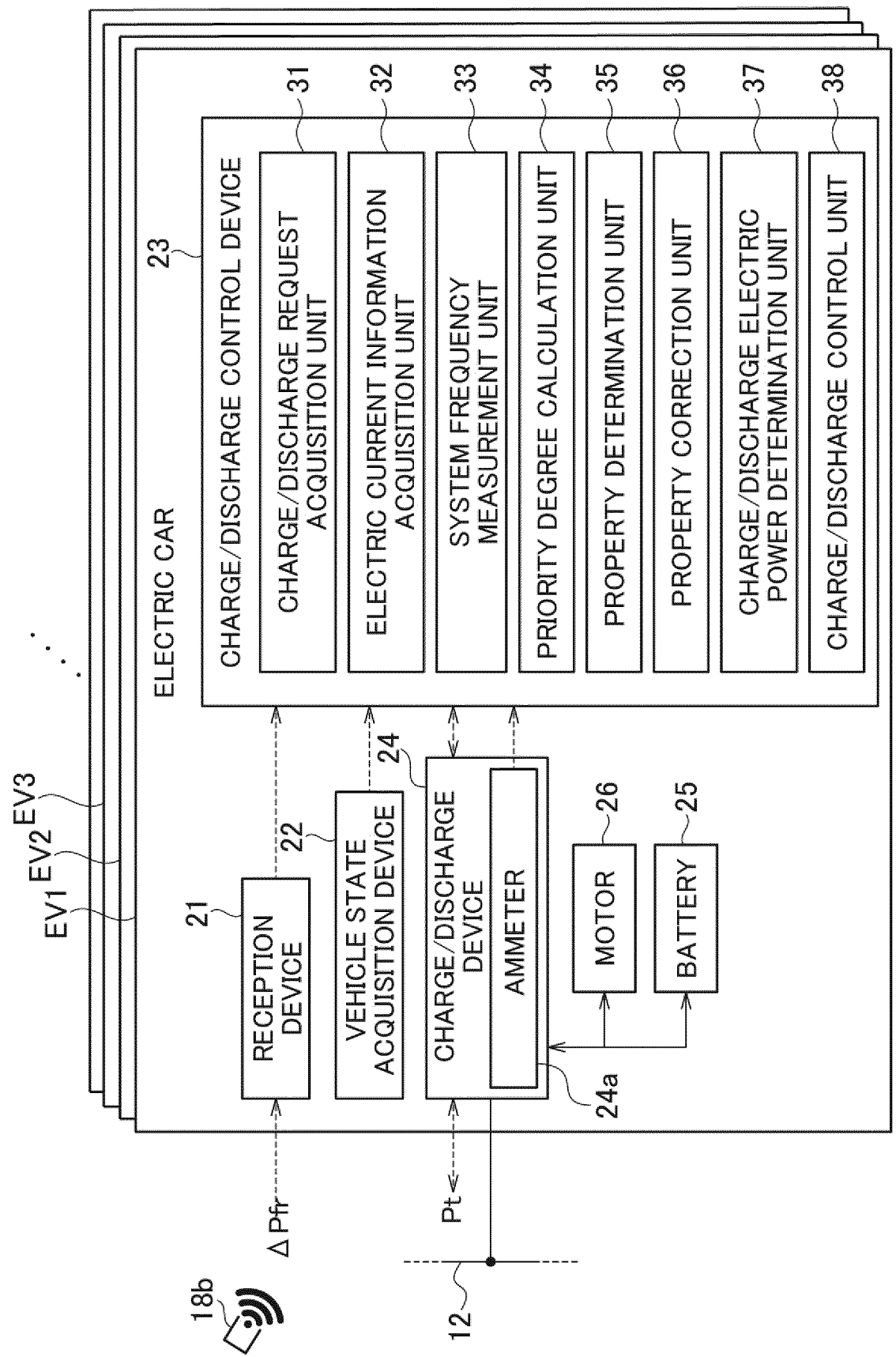
FIG. 2 is a block diagram illustrating a configuration of a charge/discharge control device and peripheral devices of an electric car in FIG. 1.

With reference to FIG. 2, description is made on a configuration of a charge/discharge control device 23 and peripheral devices thereof that are mounted on each of the electric cars EV1 to EV3 . . . connected to the electric wire 12. Note that, hereinafter, description is made on the electric car EV1 among the electric cars EV1 to EV3 . . . as an example, and the other electric vehicles EV2, EV3, . . . also include similar configurations, and can be operated similarly.

On the electric car EV1, a reception device 21 (reception unit), a vehicle state acquisition device 22, a charge/discharge device 24, a motor 26, and a battery 25 are mounted as the peripheral devices of the charge/discharge control device 23.

The reception device 21 is a device that receives an electric signal (wireless signal) broadcast-transmitted from the broadcast transmission device 18b. The electric signal received by the reception device 21 includes the signal of requesting the electric cars EV1 to EV3 as a whole to perform charging or discharging. The signal includes the signal indicating the request value (Pfr) of the frequency adjustment capacity of the electric power system 10 and the signal indicating the excess/deficit capacity (ΔPfr) of the frequency adjustment capacity, as an example of the system request.

The vehicle state acquisition device 22 acquires information indicating a state of the electric car EV1. For example, "the state of the electric car EV1" includes a current value (SOCnow) of a charging rate of the battery 25 included in the electric car EV1 and a numerical value indicating a request from a user of the electric car EV1. For example, the numerical value indicating the request from the user of the electric car EV1 is a target value (SOCgoal) of the charging rate of the battery 25 and a time at which charging/discharging of the electric car EV1 is ended (an end time Td for charging/discharging). A remaining time (T) before the end time Td is a remaining time during which the electric car EV1 can perform charging/discharging.

The charge/discharge device 24 is an onboard charger (OBC), and charges or discharges the battery 25 via the electric wire 12 under control of the charge/discharge control device 23. The charge/discharge device 24 stores the received electric power in the battery 25. Alternatively, instead of storing the received electric power in the battery 25, the charge/discharge device 24 may directly transmit the received electric power to the motor 26 as a driving source. Meanwhile, the charge/discharge device 24 discharges the electric power stored in the battery 25 or the electric power generated by the motor 26 to the electric power network 11 via the electric wire 12.

The charge/discharge device 24 includes an ammeter 24a. The ammeter 24a measures the electric current, which flows through the electric wire 12, at a position at which the electric car EV1 is connected to the electric wire 12. The position at which the electric car EV1 is connected to the electric wire 12 is referred to as "a power reception end" of the electric car EV1. The charge/discharge device 24 is capable of measuring the system frequency (f) of the electric power system 10 at the power reception end of the electric car EV1.

The battery 25 includes a secondary battery, a storage battery, and a rechargeable battery for storing the electric power received by the charge/discharge device 24. The motor 26 is a driving source of the electric car EV1 that is driven by the electric energy or the electric power stored in the battery 25.

The charge/discharge control device 23 can be implemented by using a microcomputer including a central processing unit (CPU), a memory, and an input/output unit. A computer program causing the microcomputer to function as the charge/discharge control device 23 is installed and executed by the microcomputer. With this, the microcomputer can be caused to function as a plurality of information processing units (31 to 38) included in the charge/discharge control device 23. Herein, an example in which the charge/discharge control device is implemented by software is given, and as a matter of course, the charge/discharge control device 23 may be configured by providing hardware dedicated to execute each information processing. The dedicated hardware includes devices such as an application-specific integrated circuit (ASIC) arranged to execute the functions described in the embodiment and a related-art circuit component.

Note that the charge/discharge control device 23, the reception device 21, the vehicle state acquisition device 22, and the charge/discharge device 24 are described as different members, and as a matter of course, two or more freely-selected devices may be configured as one device. Alternatively, the plurality of information processing units (31 to 38) may be divided and configured by using two or more different devices. Moreover, an entirety or a part of the plurality of information processing units (31 to 38) may be configured by using another electronic control unit (ECU) mounted on the electric car EV1.

The charge/discharge control device 23 may apply processing executed by a power reception control device disclosed in International Patent Publication No. WO 2020/194010 to processing relating to the charge/discharge control of the electric car EV1, except for processing relating to correction of a priority degree (β), which is described below.

the charge/discharge control device 23 includes, as the plurality of information processing units (31 to 38), a charge/discharge request acquisition unit 31, an electric current information acquisition unit 32, a system frequency measurement unit 33, a priority degree calculation unit 34, a property determination unit 35, a property correction unit 36, a charge/discharge electric power determination unit 37, and a charge/discharge control unit 38.

The charge/discharge request acquisition unit 31 acquires, from the electric signal received by the reception device 21, the information indicating the request value (Pfr) of the frequency adjustment capacity of the electric power system 10, which is an example of the system request, and acquires the information indicating the excess/deficit capacity (ΔPfr) of the frequency adjustment capacity.

The electric current information acquisition unit 32 acquires the electric current value of the electric wire 12 that is measured by the ammeter 24a of the charge/discharge device 24 at a connection end of the electric car EV1 with respect to the electric wire 12.

The system frequency measurement unit 33 uses the electric current value of the electric wire 12 that is acquired by the electric current information acquisition unit 32, and measures the system frequency (f) of the electric wire 12.

The priority degree calculation unit 34 calculates the priority degree (β) of the electric car EV1, based on the numerical value indicating the request from the user of the electric car EV1 (the state of the electric car EV1), the priority degree (β) indicating a degree at which charging/discharging of the own car EV1 is prioritized over charging/ discharging of the other electric cars (EV2, EV3, . . . ). The priority degree (β) can be set on each of the charge side and the discharge side.

The priority degree calculation unit 34 calculates the priority degree (β) of the electric car EV1, based on the numerical value indicating the request from the user of the electric car EV1 and the state of the electric car EV1, the priority degree (β) indicating the degree at which charging or discharging of the own car EV1 is prioritized over charging or discharging of the other electric cars (EV2, EV3, . . . ). Specifically, the priority degree calculation unit 34 uses Expression (2) to calculate the priority degree (β) based on the remaining time (T) from a current time (To) to the end time (Td) for charging or discharging. In Expression (2), N indicates the total number of electric cars that perform charging/discharging. AS the calculation method for the priority degree (β) based on the current value (SOCnow) of the charging rate and target value (SOCgoal) of the charging rate of the battery 25, a method disclosed in International Patent Publication No. WO 2020/194010 may be used.

[Expression 2]

$$\beta = \frac{1}{N \times (T_d - T_0)} \quad (2)$$

Based on the priority degree (β) calculated by the priority degree calculation unit 34 and the frequency adjustment capacity (Pfr) received by the reception device 21, the property determination unit 35 determines an output property of charging/discharging of the electric car EV1 with respect to the system frequency (f). The output property is acquired by defining the charge/discharge output of the electric car EV1 at each frequency within an adjustment range of the system frequency (f) with the reference frequency (fref) as the center. For example, when the reference frequency (fref) is 50 Hz, the adjustment range of the system frequency (f) may be set as ±0.2 Hz.

The property determination unit 35 sets a value acquired by dividing the frequency adjustment capacity (Pfr) by the total number of electric cars (N), as an output range of the adjustment range of the system frequency (f) with a basic property of charging/discharging of the electric car EV1. The output range of charging/discharging of the electric car EV1 in the adjustment range of the system frequency (f) is an element frequency adjustment capacity (Pfr/N) acquired through charging/discharging of the electric car EV1 for the electric wire 12. For example, as indicated with the solid line in FIG. 3, the basic property of charging/discharging is such a linear property that an output at the reference frequency (fref) is zero. For the basic property, an output upper limit value on the charge side is defined at the highest frequency in the adjustment range of the system frequency (f), and an output upper limit value on the discharge side is defined at the lowest frequency in the adjustment range.

The total number of electric cars (N) may be statistical data (quantitative data) obtained by examining a past charge/discharge history of the load group in the electric power system 10 including the electric cars connected to the electric wire 12, or the approximate total number of electric cars (N) can be estimated based on the current value (Pall-now) of the total charged/discharged electric power. Similarly to the electric power difference (ΔP), the total number (N) is broadcast-transmitted from the information transmission device 16 or the device accompanying with the information transmission device 16. Alternatively, the total number (N) may be specified by positional information or an identification signal of a charge system of the electric car.

The property determination unit 35 corrects the basic property of charging/discharging according to the priority degree (β) of the electric car EV1, and determines the output property of charging/discharging of the electric car EV1. For example, the priority degree calculation unit 34 calculates each of the priority degree on the charge side and the priority degree on the discharge side, the property determination unit 35 corrects the output upper limit value on the charge side, according to the priority degree on the charge side, and corrects the output upper limit value on the priority degree on the charge side according to the priority degree on the discharge side.

In FIG. 3, the broken lines respectively indicate output properties obtained by correcting the basic property according to the priority degrees (β) of the electric car EV1. The broken line having the smallest pitch indicates the output property after the correction when the priority degree on the charge side is 0.5 and the priority degree on the discharge side is 1. The broken line having the largest pitch indicates the output property after the correction when the priority degree on the charge side is 1 and the priority degree on the discharge side is 0.5. The broken line having the intermediate pitch indicates the output property after the correction when both the priority degree on the charge side and the priority degree on the discharge side are 0.5.

When the basic property is corrected according to the priority degree (β), the output range of charging/discharging of the electric car EV1 in the adjustment range of the system frequency (f) is narrower than that before the correction. In other words, when the basic property is corrected according to the priority degree (β) of the electric car EV1, the element frequency adjustment capacity acquired through charging/discharging of the electric car EV1 for the electric wire 12 is reduced from that before the correction.

Figure 4:
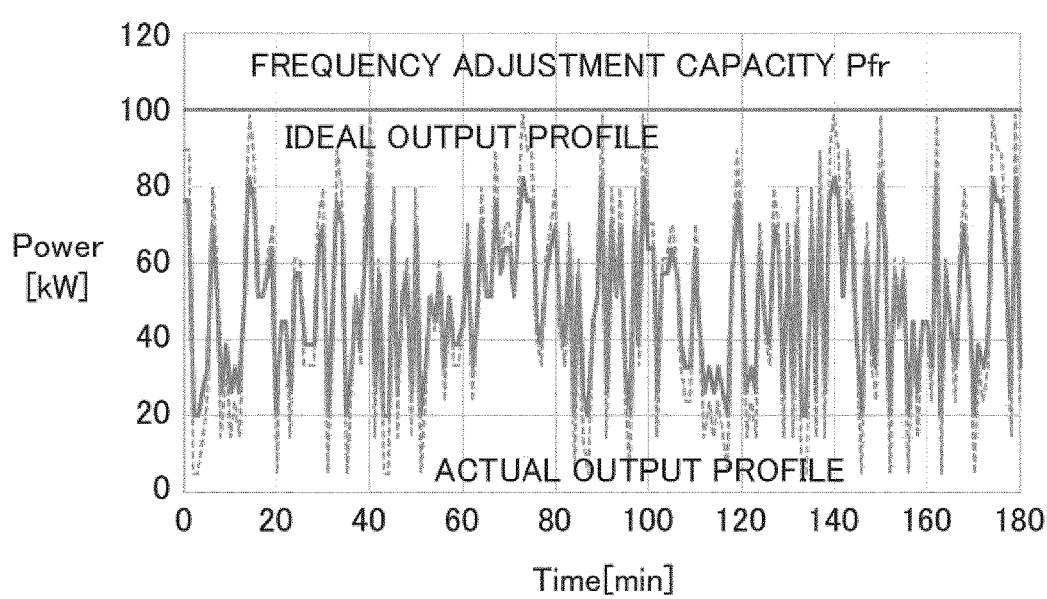
FIG. 4 is a graph showing a relationship between an actual value of a frequency adjustment capacity acquired in the electric power system and a request value of a frequency adjustment capacity broadcast-transmitted from a broadcast transmission unit to each of the electric cars when each of the electric cars in FIG. 1 performs charging/discharging with the output property determined by the property determination unit in FIG. 2.

In FIG. 4, the frequency adjustment capacity is indicated by an ideal output profile with the broken line, the frequency adjustment capacity being the total of the respective element frequency adjustment capacities acquired by the electric cars EV1 to EV3 . . . that perform charging/discharging with the basic property. Further, an actual output profile indicated with the solid line indicates the total of the element frequency adjustment capacities acquired when the electric cars EV1 to EV3 . . . perform charging/discharging with the output properties according to the priority degrees (β), respectively.

The maximum value of the ideal output profile is a value being the total of the output ranges of charging/discharging of the respective electric cars EV1 to EV3 with the basic properties. The total value corresponds to the request value (Pfr) of the frequency adjustment capacity.

The maximum value of the actual output profile is a value being the total of the output ranges of charging discharging of the respective electric cars EV1 to EV3 with the output properties determined by the property determination unit 35. The output range with the output property determined by the property determination unit 35 is narrower than the output range with the basic property, and hence the frequency adjustment capacity specified as the request value (Pfr) cannot be obtained in the actual output profile.

In a case in which the priority degree (β) calculated by the priority degree calculation unit 34 is high above a certain height level, for example, when the reception device 21 receives the excess/deficit capacity (ΔPfr) of the frequency adjustment capacity, the property correction unit 36 corrects the output property of charging/discharging of the electric car EV1 that is determined by the property determination unit 35, according to the received excess/deficit capacity (ΔPfr) of the frequency adjustment capacity.

Figure 5:
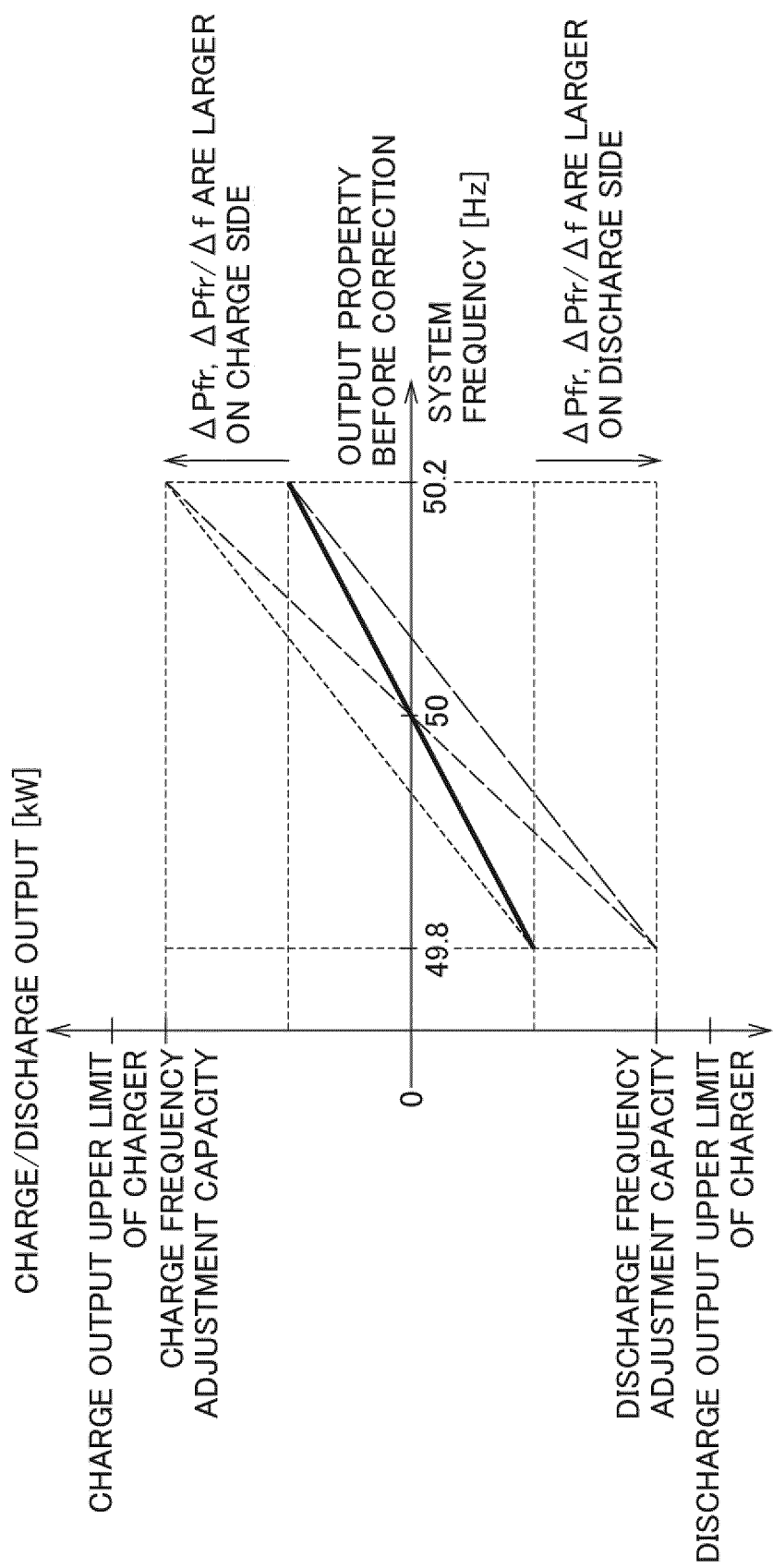
FIG. 5 is a graph showing a relationship between an output property of charging/discharging that is determined by the property determination unit in FIG. 2 according to the priority degree of the electric car and an output property of charging/discharging that is corrected by a property correction unit.

As shown in FIG. 5, for example, the property correction unit 36 corrects the output property of charging/discharging of the electric car EV1 in such a way to increase the output upper limit value on the charge side when the excess/deficit capacity (ΔPfr) is large on the charge side and increase the output upper limit value on the discharge side when the excess/deficit capacity (ΔPfr) is large on the discharge side. After the output property is corrected, the output upper limit value on the charge side or the output upper limit value on the discharge side approaches the output upper limit value with the basic property, as compared to the case with the output property before the correction. Thus, the output range is expanded more than before the correction, and approaches the output range with the basic property.

The charge/discharge electric power determination unit 37 calculates the deviation (Δf) of the system frequency (f) of the electric wire 12 with respect to the reference frequency (fref), the system frequency (f) being measured by the system frequency measurement unit 33 by using the electric current value of the electric wire 12 that is measured by the ammeter 24a. The charge/discharge electric power determination unit 37 determines an element charge/discharge output of the electric car EV1, based on the deviation (Δf) and the output property of charging/discharging determined by the property determination unit 35.

The charge/discharge control unit 38 controls the charge/discharge device 24 in such a way that the electric car EV1 performs charging or discharging with the element charge/discharge output determined by the charge/discharge electric power determination unit 37. In this manner, the charge/discharge control device 23 controls the charged/discharged electric power (P) being the electric power that is charged/discharged by the electric car EV1, by repeating the processing cycle (a) to (h) given below.

(a) Acquiring the information indicating the electric power difference (ΔP=the request value Prf of the frequency adjustment capacity);
(b) calculating the priority degree (β);
(c) determining the charge/discharge output property according to the priority degree (β), based on the request value (Pfr) of the frequency adjustment capacity;
(d) determining the element charge/discharge output from the deviation (Δf) between the system frequency (f) measured at the connection end and the reference frequency (fref), based on the charge/discharge output property according to the priority degree (β)
(e) controlling the charge/discharge device 24 in such a way that charging/discharging is performed with the determined element charge/discharge output;
(f) receiving the information indicating the excess/deficit capacity (ΔPfr) being the difference between the theoretical value and the actual value of the total charge/discharge output;
(g) correcting the charge/discharge output property according to the priority degree (β), based on the received excess/deficit capacity (ΔPfr); and
(h) controlling the charge/discharge device 24 in such a way that charging/discharging is performed with the element charge/discharge output determined based on the charge/discharge output property after the correction.

Figure 6A:
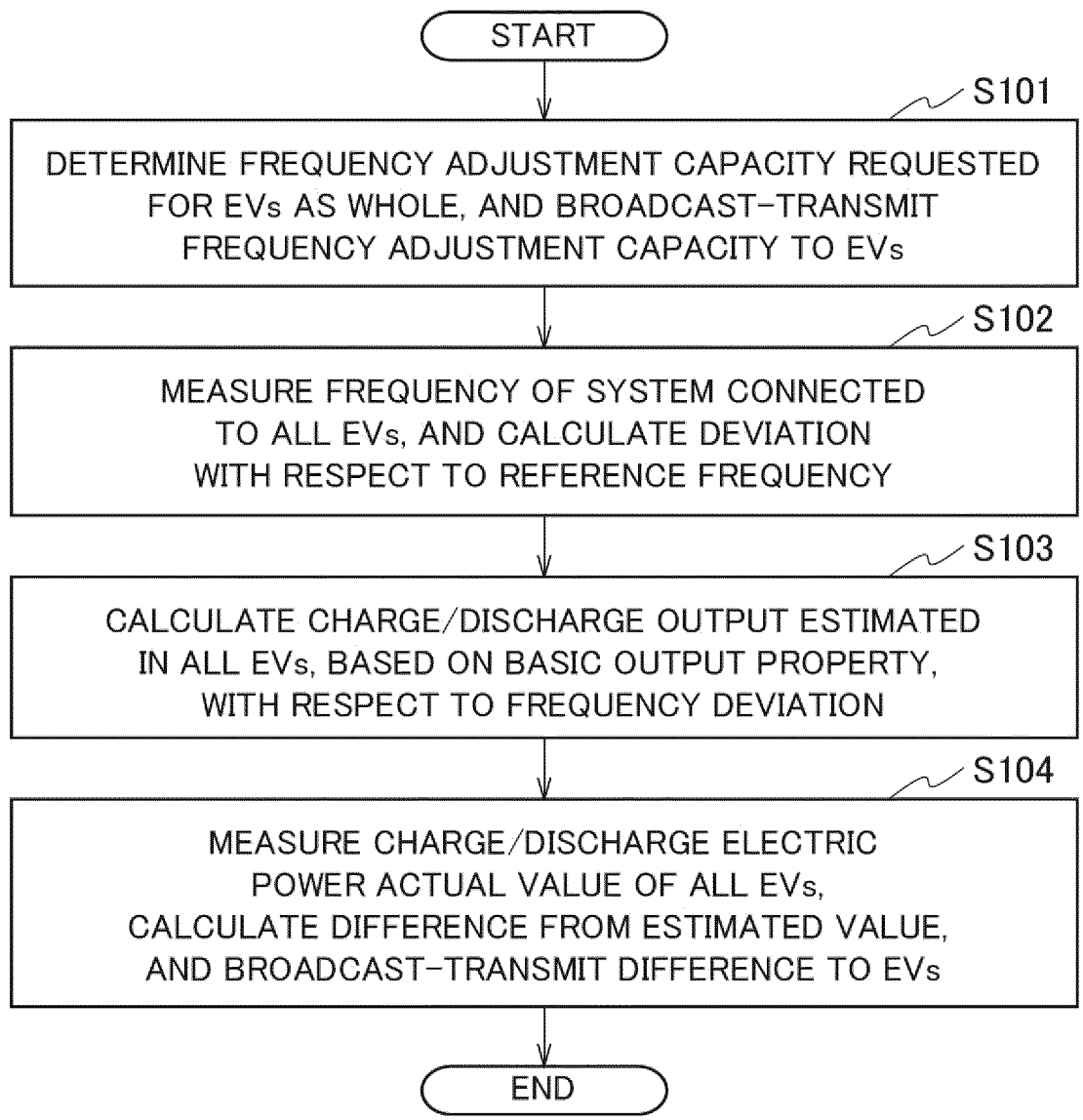
FIG. 6A is a flowchart in which processing steps executed by an information transmission device in FIG. 1 are arranged in the chronological order.

With reference to the flowchart of FIG. 6A, description is made on an example of a main processing operation performed by the information transmission device 16 in FIG. 1.

First, in Step S101, the information transmission device 16 determines the frequency adjustment capacity (Pfr) to be requested for the electric cars EV1 to EV3 . . . as a whole, and broadcast-transmits the frequency adjustment capacity (Pfr) to all the electric cars EV1 to EV3 . . . .

The processing proceeds to Step S102. After the request value (Pfr) is broadcast-transmitted, the electric current measurement device 15 measures the system frequency (f) of the electric wire 12 connected to all the electric cars EV1 to EV3 . . . , and the calculation unit 17 calculates the deviation (Δf) of the system frequency (f) measured by the electric current measurement device 15 with respect to the reference frequency (fref).

The processing proceeds to Step S103. The calculation unit 17 calculates the theoretical value of the charge/discharge output, based on the data relating to the basic output property that is read from the storage device of the information transmission device 16, with respect to the deviation (Δf) that is calculated by the electric current measurement device 15, the theoretical value being estimated in all the electric cars EV1 to EV3 . . . after the request value (Pfr) is broadcast-transmitted.

The processing proceeds to Step S104. The electric current measurement device 15 calculates, as the actual value of the charge/discharge output of all the electric cars EV1 to EV3 . . . , the current value (Pall-now) of the total charged/discharged electric power of all the electric cars EV1 to EV3 . . . after the request value (Pfr) is broadcast-transmitted. Further, the information transmission device 16 broadcast-transmits, to all the electric cars EV1 to EV3 . . . , the difference from the theoretical value of the charge/discharge output that is calculated by the calculation unit 17 in Step S103, as the excess/deficit capacity (ΔPfr) of the frequency adjustment capacity.

Figure 6B:
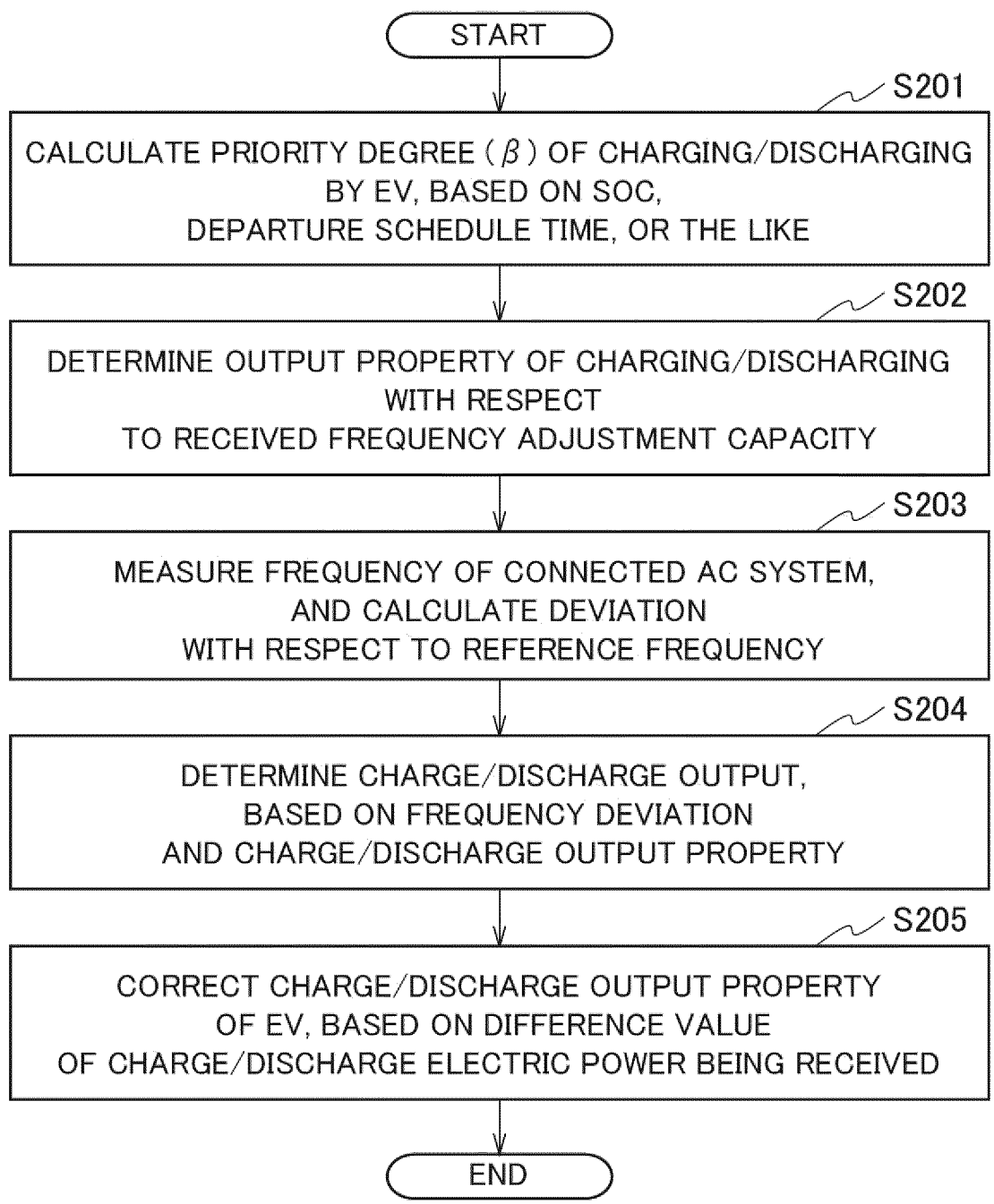
FIG. 6B is a flowchart in which processing steps executed by the charge/discharge control device in FIG. 1 are arranged in the chronological order.

With reference to the flowchart of FIG. 6B, description is made on an example a charge/discharge control method by the charge/discharge control device 23 in FIG. 2. The charge/discharge control method is performed by the charge/discharge control device 23 of each of the electric cars EV1 to EV3 . . . . Note that a person skilled in the art easily understands a specific procedure of the charge/discharge control method by the charge/discharge control device 23, based on the description of the specific configurations and functions of the charge/discharge control device 23 in FIG. 2. Thus, herein, a main processing operation of the charge/discharge control device 23 is described as the charge/discharge control method by the charge/discharge control device 23 in FIG. 2, and description on details of the processing operation, which overlaps with the description with reference to FIG. 2, is omitted.

First, in Step S201, the priority degree calculation unit 34 calculates the priority degree (β) of charging/discharging, based on the current value (SOCnow) of the charging rate of the battery 25, a departure schedule time, or the like that is acquired by the vehicle state acquisition device 22.

The processing proceeds to Step S202. The property determination unit 35 determines the output property of charging/discharging of the electric car EV1 with respect to the system frequency (f), based on the priority degree (β) that is calculated by the priority degree calculation unit 34 in Step S201 and the frequency adjustment capacity (Pfr) that is received by the reception device 21. The frequency adjustment capacity (Pfr) received by the reception device 21 is the frequency adjustment capacity (Pfr) broadcast-transmitted from the information transmission device 16 in Step S101 in FIG. 6A.

The processing proceeds to Step S203. The charge/discharge electric power determination unit 37 calculates the deviation (Δf) of the system frequency (f) of the electric wire 12 with respect to the reference frequency (fref), the system frequency (f) being measured by the system frequency measurement unit 33 by using the electric current value of the electric wire 12 that is measured by the ammeter 24a.

The processing proceeds to Step S204. The charge/discharge electric power determination unit 37 determines the element charge/discharge output of the electric car EV1, based on the deviation (Δf) calculated in Step S203 and the output property of charging/discharging determined in Step S202.

The processing proceeds to Step S205. The property correction unit 36 corrects the output property of charging/discharging of the electric car EV1 that is determined by the property determination unit 35 in Step S202, according to the excess/deficit capacity (ΔPfr) of the frequency adjustment capacity that is received by the reception device 21, in such a way to reduce the excess/deficit capacity (ΔPfr). The excess/deficit capacity (ΔPfr) of the frequency adjustment capacity that is received by the reception device 21 is the excess/deficit capacity (ΔPfr) broadcast-transmitted from the information transmission device 16 in Step S104 in FIG. 6A.

According to the embodiment of the present invention, the following advantageous effects can be obtained.

When the information transmission device 16 of the electric power system 10 broadcast-transmits the request value (Pfr) of the frequency adjustment capacity according to the deviation (Δf) of the system frequency (f) with respect to the reference frequency (fref), the charge/discharge output property is determined according to the request value (Pfr) in each of the electric cars EV1 to EV3 . . . . Each of the electric cars EV1 to EV3 . . . corrects the determined charge/discharge output property, with the priority degree (β). When the output range of the charge/discharge output property after the correction is narrower than the output range before the correction, the frequency adjustment capacity being the total of the charge/discharge outputs of the respective electric cars EV1 to EV3 . . . does not reach the request value (Pfr) of the frequency adjustment capacity.

The information transmission device 16 only includes a one-way communication function with respect to each of the electric cars EV1 to EV3 . . . , and hence the charge/discharge output property after the correction with the priority degree (β) in each of the electric cars EV1 to EV3 . . . cannot be grasped on the electric power system 10 side.

In the present embodiment, during the charge/discharge output in each of the electric cars EV1 to EV3 . . . , with regard to the charge/discharge output estimated in all the electric cars EV1 to EV3 . . . , the calculation unit 17 calculates the estimated theoretical value, and the electric current measurement device 15 calculates the actual value on the electric power system 10 side. Further, the information transmission device 16 broadcast-transmits, to all the electric cars EV1 to EV3 . . . , the difference between the actual value and the theoretical value, as the excess/deficit capacity (ΔPfr) of the frequency adjustment capacity.

In each of the electric cars EV1 to EV3 . . . , the charge/discharge control device 23 receives the excess/deficit capacity (ΔPfr) of the frequency adjustment capacity that is broadcast-transmitted thereto, and the output property of charging/discharging of the electric car EV1 that is determined by the property determination unit 35 is corrected in such a way to reduce the excess/deficit capacity (ΔPfr). In the example shown in FIG. 5, the output property of charging/discharging is corrected on a side with a larger excess/deficit capacity (ΔPfr) that is selected from the charge side and the discharge side, in such a way to reduce the excess/deficit capacity (ΔPfr).

When the excess/deficit capacity (ΔPfr) is reduced and approaches 0, the actual value of the charge/discharge output of all the electric cars EV1 to EV3 . . . approaches the theoretical value, and the system frequency (f) approaches the reference frequency (fref). Thus, the frequency adjustment capacity being the total of the charge/discharge output of the respective electric cars EV1 to EV3 . . . can be caused to approach the request value (Pfr) of the frequency adjustment capacity by correcting the output property of the charge/discharge output and increasing/reducing the actual value according to a magnitude relationship between the actual value and the theoretical value that is indicated with the sign of the excess/deficit capacity (ΔPfr). With this, the frequency adjustment capacity calculated on the electric power system 10 can sufficiently be secured by the control performed on a side of each of the electric cars EV1 to EV3 . . . .

First Modification Example

In the embodiment described above, when the reception device 21 receives the excess/deficit capacity (ΔPfr) of the frequency adjustment capacity, the property correction unit 36 corrects the output property of charging/discharging of the electric car EV1 that is determined by the property determination unit 35, according to the received excess/deficit capacity (ΔPfr) of the frequency adjustment capacity. Alternatively, the property correction unit 36 may calculate a time change rate ((ΔPfrt+1−ΔPfrt)/Δt) of the excess/deficit capacity (ΔPfr) received by the reception device 21 per unit time (Δt). In this case, the property correction unit 36 is capable of correcting the output property of charging/discharging of the electric car EV1 that is determined by the property determination unit 35, according to the time change rate ((ΔPfrt+1−ΔPfrt)/Δt).

The time change rate ((ΔPfrt+1−ΔPfrt)/Δt) of the excess/deficit capacity (ΔPfr) is a positive (+) value as the excess/deficit capacity (ΔPfr) is increased over time, and is a negative (−) value as the excess/deficit capacity (ΔPfr) is reduced.

When the sign of the time change rate ((ΔPfrt+1−ΔPfrt)/Δt) is positive, the frequency adjustment capacity (Pfr), which is excessively large as it is, is reduced in such a way that the increase of the time change rate ((ΔPfrt+1−ΔPfrt)/Δt) over time takes a downward turn. When the sing of the time change rate ((ΔPfrt+1−ΔPfrt)/Δt) is negative, the value of the frequency adjustment capacity (Pfr) is increased compared to the current level in such a way to accelerate the reduction of the time change rate ((ΔPfrt+1−ΔPfrt)/Δt) over time. With this, followability of the actual value with respect to the request value (Pfr) of the frequency adjustment capacity can be improved.

Second Modification Example

Further, the property correction unit 36 may calculate, a frequency deviation change rate ((ΔPfrf+1−ΔPfrf)/Δf), a change rate of the excess/deficit capacity (ΔPfr) received by the reception device 21, based on the deviation (Δf) between the system frequency (f) and the reference frequency (fref). In this case, the property correction unit 36 is capable of correcting the output property of charging/discharging of the electric car EV1 that is determined by the property determination unit 35, according to the frequency deviation change rate (($\Delta$Pfrf+1−$\Delta$Pfrf)/$\Delta$f).

When the excess/deficit capacity ($\Delta$Pfr) is increased as the deviation ($\Delta$f) between the system frequency (f) and the reference frequency (fref) is increased, the frequency deviation change rate (($\Delta$Pfrf+1−$\Delta$Pfrf)/$\Delta$f) is a positive (+) value indicating that the system frequency is higher than the reference frequency. When the excess/deficit capacity ($\Delta$Pfr) is reduced as the deviation (40 between the system frequency (f) and the reference frequency (fref) is increased, the frequency deviation change rate (($\Delta$Pfrf+1−$\Delta$Pfrf)/$\Delta$f) is a negative (−) value indicating that the system frequency is lower than the reference frequency.

When the sign of the frequency deviation change rate (($\Delta$Pfrf+1−$\Delta$Pfrf)/$\Delta$f) is positive, the value of the frequency adjustment capacity (Pfr), which is excessively large as it is, is reduced in such a way that the system frequency (f) approaches the reference frequency (fref) lower than the system frequency. When the sing of the frequency deviation change rate (($\Delta$Pfrf+1−$\Delta$Pfrf)/$\Delta$f) is negative, the frequency adjustment capacity (Pfr), which is excessively small as it is, is increased in such a way that the system frequency (f) approaches the reference frequency (fref) higher than the system frequency. With this, rapidity at the time of restoring the fluctuating system frequency (f) to the reference frequency (fref) can be improved.

Third Modification Example

In the embodiment, the first modification example, and the second modification example described above, the information transmission device 16 broadcast-transmits the request value (Pfr) of the frequency adjustment capacity to all the electric cars EV1 to EV3, in relation to the total charged/discharged electric power of the electric cars EV1 to EV3 as a whole. However, the information transmission device 16 may broadcast-transmit, to all the electric cars EV1 to EV3 . . . , the request value (Pfr) of the frequency adjustment capacity separately between a total charging electric power and a total discharging electric power of the electric cars EV1 to EV3 as a whole. In this case, the reception device 21 of the charge/discharge control device 23 separately receives each of a request value of the frequency adjustment capacity on the charge side and a request value of the frequency adjustment capacity on the discharge side.

When the request value (Pfr) of the frequency adjustment capacity is distributed separately as the request value on the charge side and the request value on the discharge side, the charge/discharge control device 23 is capable of separately determining the output property on the charge side and the output property on the discharge side for each of the electric cars EV1 to EV3 . . . . Thus, the correction of the output property according to the priority degree ($\beta$) can be performed separately between the charge side and the discharge side, and the processing of correcting the output property is facilitated.

Fourth Modification Example

In the embodiment, and the first modification example to the third modification example described above, the upper limits of the output ranges of the output properties on the charge side and the discharge side are corrected and increased to higher values according to the priority degree ($\beta$) of each of the electric cars EV1, EV2, EV3, . . . , as shown in FIG. 5. However, at the time of the correction according to the priority degree ($\beta$), the lower limits may be increased, instead of increasing the upper limits of the output ranges of the output properties on the charge side and the discharge side.

Figure 7A:
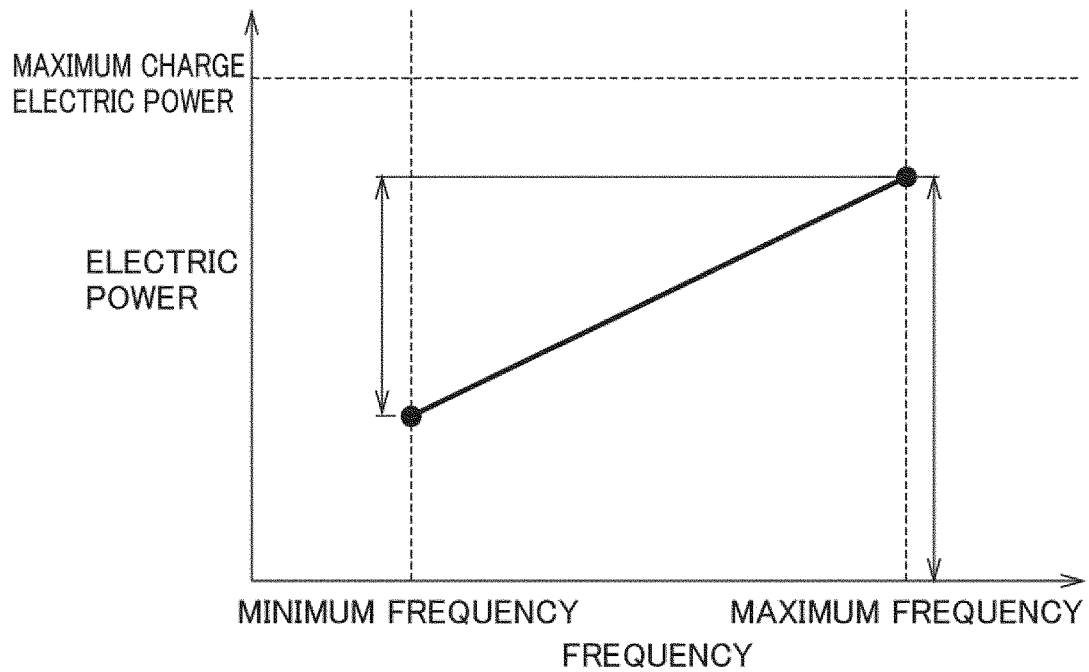
FIG. 7A is a graph showing an output property of charging that is corrected by the property correction unit in FIG. 2.

For example, in a case of the output property on the charge side shown in FIG. 7A, a drop amount of the lower limit value with respect to the upper limit value of the output range present only on the charge side is reduced as the priority degree ($\beta$) is higher, and is increased as the priority degree ($\beta$) is lower. Further, when the property correction unit 36 corrects the output property of charging/discharging of the electric car EV1 that is determined by the property determination unit 35, according to the excess/deficit capacity ($\Delta$Pfr) of the frequency adjustment capacity that is received by the reception device 21, an amount by which the drop amount of the lower limit value with respect to the upper limit value of the output range on the charge side is reduced is also increased as the excess/deficit capacity ($\Delta$Pfr) is larger, and is also reduced as the excess/deficit capacity ($\Delta$Pfr) is smaller.

In this case, the electric cars EV1, EV2, EV3, . . . with the high priority degrees ($\beta$) can also be caused to perform charging with high electric power, regardless of the height of the system frequency (f)

Fifth Modification Example

In the fourth modification example, the inclination of the output property on the charge side is increased as the priority degrees ($\beta$) of the electric cars EV1, EV2, EV3, . . . is lower. Further, the upper limit value of the output range on the charge side is lower as the priority degree ($\beta$) of the electric cars EV1, EV2, EV3, . . . is lower. Thus, as the priority degree ($\beta$) is lower, it is more likely that the lower limit value of the output property on the charge side is a value lower than a base electric power (Pbase) that is constantly supplied from the battery 25 to a dark electric current load.

In a case in which each of the electric cars EV1 to EV3 . . . is a charge control element in which the output range of the output property is present only on the charge side, when the lower limit value of the charge output is set to a value lower than the base electric power (Pbase) that is constantly supplied from the battery 25 to the dark electric current load, the charge output is below the base electric power Pbase on the minimum frequency side of the adjustment range of the system frequency (f). In this state, the battery 25 cannot be charged with the electric power, and the element frequency adjustment capacity (Pfr/N) cannot be obtained.

Figure 7B:
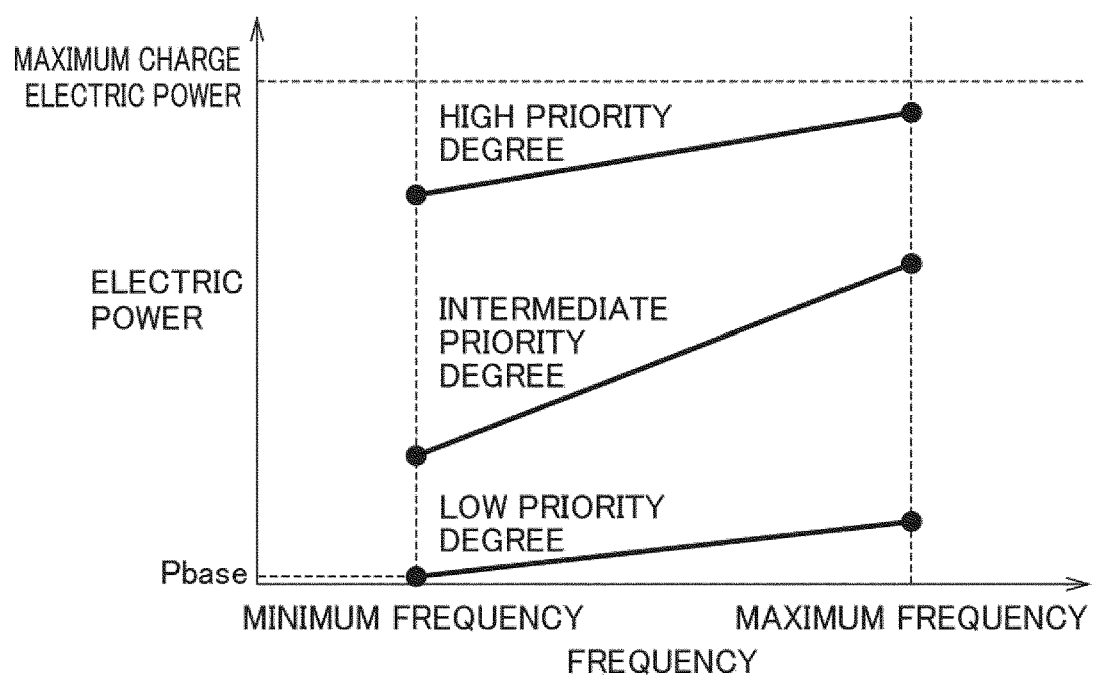
FIG. 7B is a graph showing an output property of charging that is determined by the property determination unit in FIG. 2 for each priority degree.

In view of this, when the lower limit value of the output property on the charge side with the low priority degree ($\beta$) is set to a value less than the base electric power (Pbase), the property determination unit 35 may determine the output property with the lower limit value being a value equal to or greater than the base electric power (Pbase), as shown in FIG. 7B. In this case, the property determination unit 35 may determine the output property on the charge side with the high or intermediate priority degree ($\beta$), and thus the lower limit value of the output property on the charge side with the low priority degree ($\beta$) is a value equal to or greater than the base electric power (Pbase) so as compensate a deficient element frequency adjustment capacity (Pfr/N) on the charge side.

Figure 8:
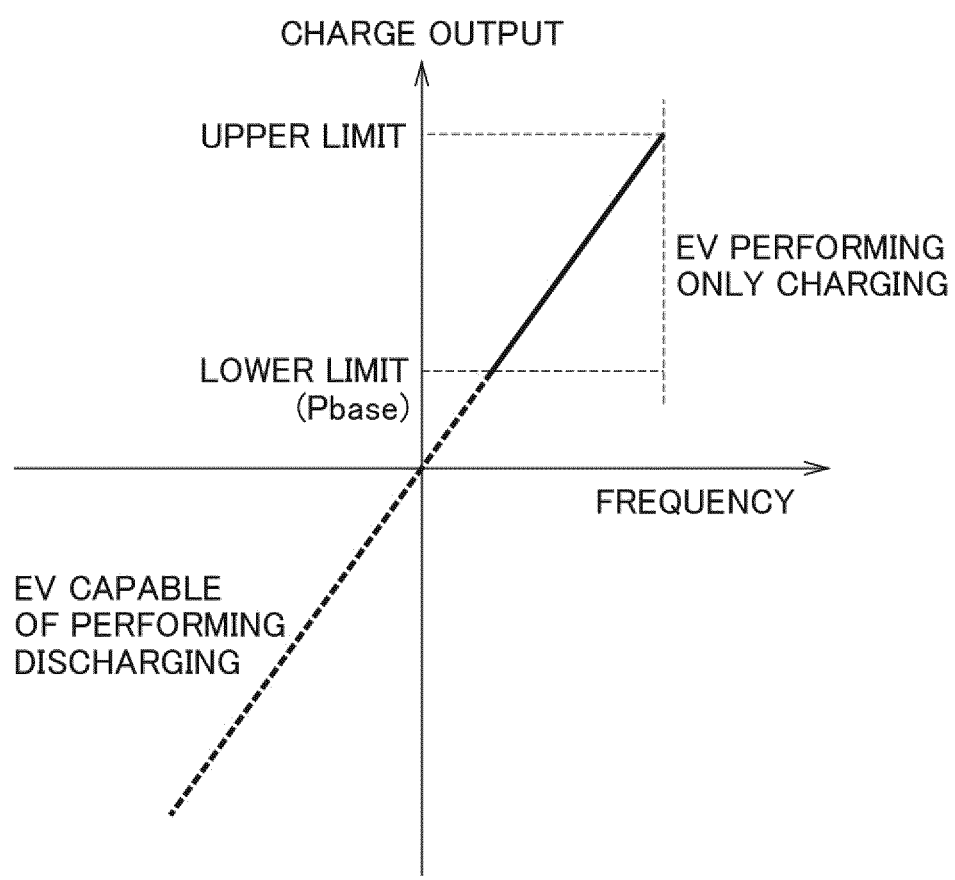
FIG. 8 is a graph schematically showing a state in which an output property part of an output property only on a charge side that is determined by the property determination unit in FIG. 2 is compensated with another charge/discharge output property over a charge side and a discharge side, the output property part associated with a system frequency being a value equal to or less than base electric power.

FIG. 8 is a graph schematically showing a state in which an output property part of the output property, which is determined by property determination unit 35, of the electric car EV1, EV2, EV3, . . . that has the output property only on the charge side and have the low priority degree (β) is compensated with the charge/discharge output property of another electric car EV1, EV2, EV3, . . . that is set over the charge side and the discharge side, the output property part associated with the system frequency (f) being a value equal to or less than the base electric power (Pbase).

With this, continuity of the frequency adjustment capacity with respect to the deviation (Δf) between the system frequency (f) and the reference frequency (fref) can be secured.

Note that the embodiment described above is an example of the present invention. Thus, the present invention is not limited to the above-mentioned embodiment, and, as a matter of course, various modifications can be made according to design or the like without departing from the technical spirit according to the present invention even in an embodiment other than the embodiment.

REFERENCE SIGNS LIST

10 Electric power system
12 Electric wire
21 Reception device
34 Priority degree calculation unit
35 Property determination unit
36 Property correction unit
38 Charge/discharge control unit
EV1, EV2, EV3 . . . Electric car

The invention claimed is:

1. A charge/discharge control method for a charge/discharge element, comprising:
   receiving a request value of a frequency adjustment capacity according to a system frequency of an electric power system, the request value being broadcast-transmitted to a plurality of charge/discharge elements connected to an electric wire of the electric power system;
   determining an output property of charging/discharging with respect to the system frequency, based on a priority degree and the request value being received, the priority degree indicating a degree at which charging or discharging of an own element is prioritized over charging or discharging of another charge/discharge element;
   correcting the output property to increase an upper limit value or a lower limit value of an output range as the priority degree is higher; and
   performing charging or discharging with an output determined based on a deviation between the system frequency measured at a connection end to the electric power system and a reference frequency of the electric power system and the output property after the correction.

2. The charge/discharge control method for a charge/discharge element according to claim 1, wherein
   a difference between a theoretical value of a charge/discharge output of all the plurality of charge/discharge elements and an actual value of a charge/discharge output of all the plurality of charge/discharge elements that is measured in the electric power system is received through broadcast-transmission with respect to all the plurality of charge/discharge elements, the theoretical value being a value according to a deviation between an actual measurement value of the system frequency and the reference frequency when each of the plurality of charge/discharge elements performs charging or discharging with the output property being determined, and
   the output property is corrected to reduce the frequency adjustment capacity when the difference being received indicates that the actual value is higher than the theoretical value, and is corrected to increase the frequency adjustment capacity when the difference being received indicates that the actual value is lower than the theoretical value.

3. The charge/discharge control method for a charge/discharge element according to claim 2, wherein
   a time change rate of the difference being received is calculated, and the output property is corrected to reduce the frequency adjustment capacity when a sign of the time change rate being calculated is positive, and is corrected to increase the frequency adjustment capacity when the sign of the time change rate is negative.

4. The charge/discharge control method for a charge/discharge element according to claim 2, wherein
   a frequency deviation change rate being a change rate of the difference being received, due to the deviation between the actual measurement value of the system frequency and the reference frequency, is calculated, and the output property is corrected to reduce the frequency adjustment capacity when a sign of the frequency deviation change rate being calculated is positive, and is corrected to increase the frequency adjustment capacity when the sign of the frequency deviation change rate is negative.

5. The charge/discharge control method for a charge/discharge element according to claim 1, wherein
   the request value being broadcast-transmitted separately between a charge side and a discharge side is received, the output property is determined and corrected separately between the charge side and the discharge side, based on the request value being received on each of the charge side and the discharge side, charging is performed with an output determined based on the output property after the correction on the charge side, and discharging is performed with an output determined based on the output property after the correction on the discharge side.

6. The charge/discharge control method for a charge/discharge element according to claim 1, wherein
   a charge/discharge control element among the plurality of charge/discharge elements that determines and corrects the output property with an output range present only on the charge side determines the output property, based on the priority degree and the request value being received, in such a way that a lower limit value of the output range present only on the charge side is a value equal to or greater than base electric power that is constantly supplied to a dark electric current load.

7. A charge/discharge control device for a charge/discharge element, comprising:
   a reception unit configured to receive a request value of a frequency adjustment capacity according to a system frequency of an electric power system, the request value being broadcast-transmitted to a plurality of charge/discharge elements connected to an electric wire of the electric power system;
   a priority degree calculation unit configured to calculate a priority degree indicating a degree at which charging or discharging of an own element is prioritized over charging or discharging of another charge/discharge element;

a property determination unit configured to determine an output property of charging/discharging with respect to the system frequency, based on the priority degree and the request value;

a property correction unit configured to correct the output property to increase an upper limit value or a lower limit value of an output range as the priority degree is higher; and a control unit configured to control an output of charging or discharging in the electric power system to an output determined based on a deviation between the system frequency measured at a connection end to the electric wire and a reference frequency of the electric power system and the output property after the correction.

* * * * *